(12) United States Patent
Shiina et al.

(10) Patent No.: US 9,673,689 B2
(45) Date of Patent: Jun. 6, 2017

(54) ROTATING ELECTRIC MACHINE AND POWER TRANSMISSION DEVICE INCLUDING ROTORS AND ELECTRIC POWER UNIT

(75) Inventors: Takahiro Shiina, Susono (JP); Akira Murakami, Gotenba (JP); Tadashi Fujiyoshi, Susono (JP); Yasumitsu Osada, Toyota (JP); Takao Watanabe, Nagakute (JP); Shu Asami, Nagoya (JP); Eiji Tsuchiya, Nisshin (JP); Tomoyuki Tohyama, Chita (JP)

(73) Assignees: Toyota Jidosha Kabushiki Kaisha, Toyota-shi, Aichi (JP); Kabushiki Kaisha Toyota Chuo Kenkyusho, Nagakute-shi, Aichi (JP); Aisin Seiki Kabushiki Kaisha, Kariya-shi, Aichi (JP)

( * ) Notice: Subject to any disclaimer, the term of this patent is extended or adjusted under 35 U.S.C. 154(b) by 379 days.

(21) Appl. No.: 14/240,103

(22) PCT Filed: Aug. 6, 2012

(86) PCT No.: PCT/JP2012/070025
§ 371 (c)(1),
(2), (4) Date: Feb. 21, 2014

(87) PCT Pub. No.: WO2013/038845
PCT Pub. Date: Mar. 21, 2013

(65) Prior Publication Data
US 2014/0197716 A1    Jul. 17, 2014

(30) Foreign Application Priority Data
Sep. 13, 2011   (JP) .................................. 2011-198984

(51) Int. Cl.
H02K 16/02 (2006.01)
H02K 11/04 (2016.01)
(Continued)

(52) U.S. Cl.
CPC .............. *H02K 16/02* (2013.01); *B60L 11/14* (2013.01); *H02K 13/003* (2013.01); *H02K 51/00* (2013.01);
(Continued)

(58) Field of Classification Search
CPC .. H02K 16/02; H02K 13/003; H02K 11/0015; H02K 11/0031; H02K 16/00; H02K 11/04; H02K 11/042; H02K 7/083
(Continued)

(56) References Cited

U.S. PATENT DOCUMENTS 5,744,895 A * 4/1998 Seguchi ................. H02K 51/00
310/114
5,917,248 A    6/1999 Seguchi et al.
(Continued)

FOREIGN PATENT DOCUMENTS

| JP | 9-322499 | 12/1997 |
| JP | 2002-369467 | 12/2002 |

(Continued)

OTHER PUBLICATIONS

Machine translation of JP 2010126025 A (Jun. 2010).*
Machine translation of JP 2002369467 A (Dec. 2002).*

*Primary Examiner* — Michael Andrews
(74) *Attorney, Agent, or Firm* — Finnegan, Henderson, Farabow, Garrett & Dunner, LLP

(57) ABSTRACT

Provided is a compound motor (14) comprising a magnet rotor (19) supported by bearings (B3, B4) in a rotatable manner, a winding rotor (20) supported by bearings (B5, B6) in a rotatable manner relative to the magnet rotor (19) at the (Continued)

inner side of the magnet rotor (19) and having rotor winding units (20b), and slip ring mechanisms (25). A space is formed in the inner circumference of the winding rotor (20). At least a part of the slip ring mechanisms (25) is arranged in the space of the inner circumference of the winding rotor (20). The bearings (B3 to B6) include bearings (B3, B6), the internal diameter of each is larger than the size of slip ring mechanisms (25) with respect to the radial direction. The bearings (B3, B6) are arranged outside the slip ring mechanisms (25) with respect to the radial direction.

8 Claims, 7 Drawing Sheets

(51) Int. Cl.
  *H02K 51/00* (2006.01)
  *H02K 13/00* (2006.01)
  *B60L 11/14* (2006.01)
  *H02K 99/00* (2014.01)

(52) U.S. Cl.
  CPC .......... *H02K 99/00* (2016.11); *B60L 2220/52* (2013.01); *B60L 2240/486* (2013.01); *B60L 2240/507* (2013.01); *Y02T 10/641* (2013.01); *Y02T 10/70* (2013.01); *Y02T 10/7077* (2013.01)

(58) Field of Classification Search
  USPC ........................ 310/68 B, 112, 114, 232, 231
  See application file for complete search history.

(56) References Cited

U.S. PATENT DOCUMENTS

| 2008/0061652 A1 | 3/2008 | Yamamuro et al. |
| 2008/0197746 A1 | 8/2008 | Wada et al. |
| 2010/0219706 A1 | 9/2010 | Watanabe et al. |

FOREIGN PATENT DOCUMENTS

| JP | 2002369467 A | * 12/2002 | ............ H02K 16/00 |
| JP | 2004-92687 | 3/2004 | |
| JP | 2005-337025 | 12/2005 | |
| JP | 2008-206320 | 9/2008 | |
| JP | 2008-228495 | 9/2008 | |
| JP | 2010-126025 | 6/2010 | |
| JP | 2010126025 A | * 6/2010 | ............ H02K 16/00 |

* cited by examiner

ROTATING ELECTRIC MACHINE AND POWER TRANSMISSION DEVICE INCLUDING ROTORS AND ELECTRIC POWER UNIT

CROSS-REFERENCE TO RELATED APPLICATIONS

This application is a national phase application of International Application No. PCT/JP2012/070025, filed Aug. 6, 2012, and claims the priority of Japanese Application No. 2011-198984, filed Sep. 13, 2011, the content of both of which is incorporated herein by reference.

TECHNICAL FIELD

The present invention relates to a rotating electric machine and a power transmission device comprising the rotating electric machine, the rotating electric machine comprising: a first rotor; a second rotor having coils and being provided at the inner side the first rotor in a rotatable manner relative to the first rotor; and an electric power transmission unit.

BACKGROUND ART

As a drive device installed in a vehicle, already known is a device where a rotating electric machine is provided in a power transmission route between an internal-combustion engine and a drive wheel, and the rotating electric machine controls torque and rotational speed to be transmitted to the drive wheel in the rotating electric machine. For example, known is a drive device which comprises a rotating electric machine and controls torque and rotational speed in the rotating electric machine, the rotating electric machine being provided with a stator; a first rotor being arranged at the inner side of the stator and having magnet; and a second rotor being arranged at the inner side of the first rotor and having coils, which are provided coaxially in a relatively rotatable manner (see the patent literature 1). In addition, there are the patent literatures 2 to 4 as prior art literatures relating to the present invention.

CITATION LIST

Patent Literature

PTL1: JP-A-H09-322499
PTL2: JP-A-2008-228495
PTL3: JP-A-2008-206320
PTL4: JP-A-2010-126025

SUMMARY OF INVENTION

Technical Problem

In the rotating electric machine provided to the device of the patent literature 1, the coils of the second rotor and an inverter are electrically connected with each other using plural slip rings. In this rotating electric machine, the plural slip rings are provided so as to align next to the second rotor in an axial direction. Therefore, the length with respect to the axial direction of the rotating electric machine increases.

Then, the present invention aims to provide a rotating electric machine capable of reducing the length in the axial direction and a power transmission device comprising the rotating electric machine.

Solution to Problem

A rotating electric machine as one aspect of the present invention is a rotating electric machine comprising: a first rotor being supported by a plurality of bearings in a rotatable manner around an axis, the first rotor having an inner circumference in which a space is formed; a second rotor being supported by a plurality of bearings in a rotatable manner relative to the first rotor while being arranged coaxially with the first rotor in the space of the inner circumference of the first rotor, the second rotor having coils; an electric power transmission unit having at least one rotating member which rotates integrally with the second rotor by being connected electrically with the coils, the electric power transmission unit connecting a predetermined connection object fixed in an unrotatable manner and the coils, and wherein a space is formed in an inner circumference of the second rotor, at least a part of the power transmission unit is arranged in the space of the inner circumference of the second rotor, both of the plurality of bearings supporting the first rotor and the plurality of bearings supporting the second rotor include a large diameter bearing having an internal diameter which is larger than size of the power transmission unit with respect to a radial direction, and the large diameter bearing is arranged outside the electric power transmission unit with respect to the radial direction.

According to the rotating electric machine of the present invention, since at least a part of the electric power transmission unit is arranged in the space of the inner circumference of the second rotor, it is possible to reduce the length of the rotating electric machine with respect to the axial direction by the length of the part arranged in the space. In addition, according to the present invention, since the bearings supporting the rotor in a rotatable manner are arranged outside of the electric power transmission unit with respect to the radial direction, it is possible to further reduce the length with respect to the axial direction, comparing with a case that the bearings are arranged so as to be aligned with the electric power transmission unit in the axial direction. Accordingly, it is possible to reduce the length of the rotating electric machine with respect to the axial direction.

In one embodiment of the rotating electric machine of the present invention, a whole of the electric power transmission unit may be arranged in the space in the inner circumference of the second rotor. In this case, it is possible to reduce the length of the rotating electric machine by the length corresponding to the whole of electric power transmission unit, with respect to the axial direction. Therefore, it is possible to further reduce the length of the rotating electric machine with respect to the axial direction.

In the above embodiment, the rotating electric machine may further comprises a rotational speed detecting unit which is configured to detect rotational speed of the second rotor, and wherein size of the rotational speed detecting unit with respect to a radial direction may be set so as to be equal to size of the electric power transmission unit with respect to a radial direction, and at least a part of the rotational speed detecting device may be arranged in the space in the inner circumference of the second rotor. In this case, even if the rotational speed detecting unit is provided, it is possible to suppress to increase the length of the rotating electric machine with respect to the axial direction longer.

In one embodiment of the rotating electric machine of the present invention, a part of the electric power transmission unit may be arranged in the space of the inner circumference of the second rotor, and a remaining part of the electric power transmission unit may be arranged outside the space of the inner circumference of the second rotor. In this embodiment, since a part of the electric power transmission unit is arranged at an inner side of the second rotor, it is possible to reduce the length with respect to the axial direction by the length corresponding to the part. In general, an electric cable is connected with the electric power transmission unit for giving and taking electric power between the electric power transmission unit and a connection object. In this embodiment, since the remaining part is arranged outside the second rotor, it is possible to reduce the length of the electric cable to be arranged inside the second rotor. Accordingly, it is possible to improve the degree of freedom with respect to arrangement of the electric cable.

In the above embodiment, the rotational speed detecting unit configured to detect the rotational speed of the second rotor may be provided so as to be aligned with the electric power transmission unit with respect to an axial direction, outside the space of the inner circumference of the second rotor, and the electric power transmission unit may have a cable member: extending in the axial direction from a part where the cable member is arranged in the space of the inner circumference of the second rotor until an outside of the second rotor; and having a direction extending outside with respect to the radial direction which is changed before reaching the rotational speed detecting unit. According to this embodiment, it is possible to get out the cable member easily to the outside of the second rotor, regardless of the size of the rotational speed detecting unit.

In one embodiment of the rotating electric machine of the present invention, the rotating electric machine may further comprises a seal member for separating between the space where the second rotor is arranged and the space where the electric power transmission unit is arranged, and wherein the seal member may be: formed so that an external diameter of the seal member is smaller than an internal diameter of the second rotor and an internal diameter of the seal member is larger than the size of the electric power transmission unit with respect to the radial direction; and arranged outside the electric power transmission unit with respect to the radial direction. By arranging the seal member in this way, it is possible to further reduce the length of the rotating electric machine with respect to the axial direction, comparing to a case that the seal member is arranged so as to be aligned with the electric power transmission unit with respect to the axial direction.

In one embodiment of the rotating electric machine of the present invention, an insulating member mat be provided between the second rotor and the electric power transmission unit. In this case, since it is possible to prevent a short circuit between the second rotor and the electric power transmission unit, it is possible to make a gap between the second rotor and the electric power transmission unit smaller with respect to the radial direction. Therefore, it is possible to reduce size of the rotating electric machine with respect to the radial direction.

A power transmission device as one aspect of the present invention is a power transmission device comprising the above mentioned rotating electric machine, and wherein one of the first rotor and the second rotor is connected with a power source, and the other one of the first rotor and the second rotor is connected with a drive object which is driven by the drive source.

According to the power transmission device of the present invention, the power transmission device comprises the rotating electric machine mentioned above. Thereby, it is possible to reduce the length of the device with respect to the axial direction. Therefore, it is possible to improve installability to a vehicle, a device and the like.

DESCRIPTION OF EMBODIMENTS

The First Embodiment

Figure 1:
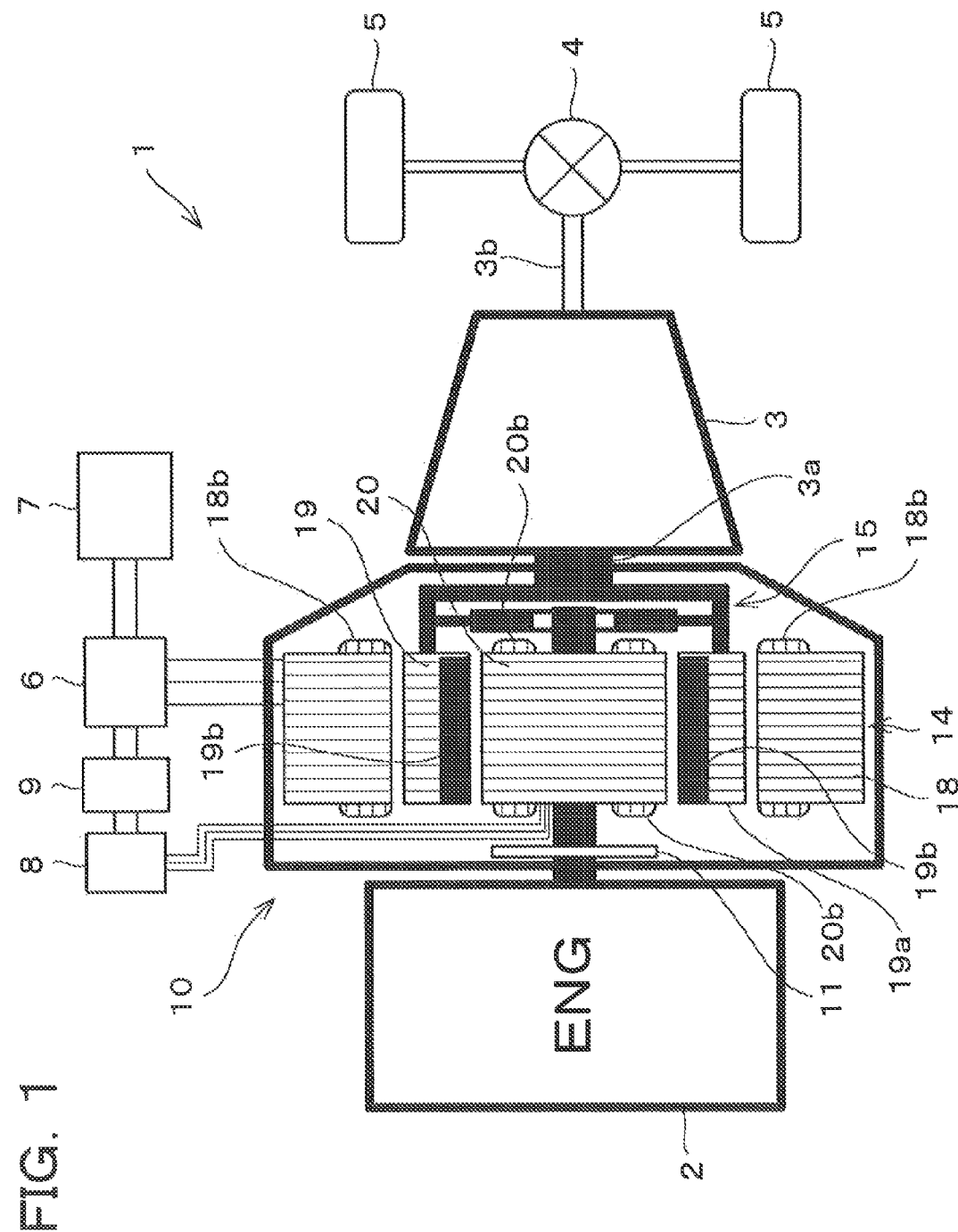
FIG. 1 is a diagram showing schematically a vehicle where a power transmission device having a rotating electric machine according to a first embodiment of the present invention is mounted.

In reference to FIGS. 1 to 5, a power transmission device in which a rotating electric machine according to the first embodiment of the present invention is installed will be described. The power transmission device 10 is mounted on a vehicle 1. FIG. 1 schematically shows a main part of the vehicle 1. An internal-combustion engine 2 is mounted on the vehicle 1 as a power source for traveling. Since the internal-combustion engine 2 is well known one to be mounted on a vehicle such as a car, detailed explanation is omitted. A transmission 3 is mounted on the vehicle 1. The transmission 3 is a well-known one which is configured so as to switch a change gear ratio between an input shaft 3*a* and an output shaft 3*b* to any one of change gear ratios which are different from each other. Therefore, detailed explanation of the transmission 3 is omitted. The output shaft 3*b* of the transmission 3 is connected with right and left driving wheels 5 via a differential mechanism 4. As shown in this figure, the power transmission device 10 is provided between the internal-combustion engine 2 and transmission 3. Therefore, the internal-combustion engine 2 corresponds to the power source of the present invention, and the transmission 3 corresponds to a drive object of the present invention.

Figure 2:
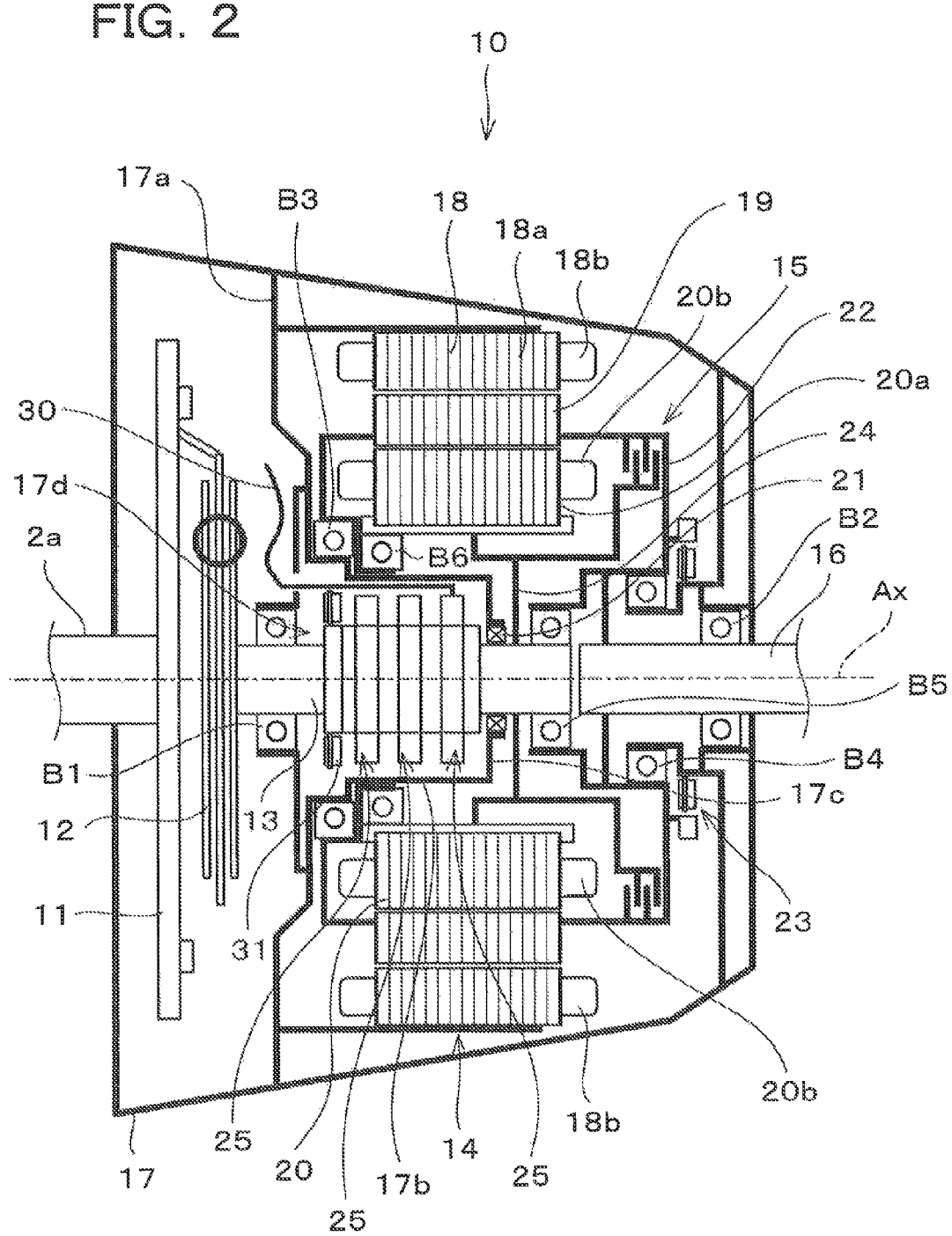
FIG. 2 is a diagram showing schematically the power transmission device.

FIG. 2 shows schematically an inside of the power transmission device 10. The power transmission device 10 comprises a fly wheel 11, a damper 12, an input shaft 13, a compound motor 14 as a rotating electric machine, a clutch, and an output shaft 16. As shown in this figure, those ones are housed in a case 17. As shown in this figure, the case 17 comprises a partition member 17*a* separating the inside of the case 17 into two parts in a direction of an axis Ax. The partition member 17*a* separates the inside of the case 17 into a space of an internal-combustion engine 2 side (the left side of FIG. 2) and a space of a transmission 3 side (the right side of FIG. 2). The fly wheel 11 and the damper 12 are arranged in the space of the internal-combustion engine 2 side. The input shaft 13, the compound motor 14, the clutch 15, and the output shaft 16 are arranged in the space of transmission 3 side.

The input shaft 13 is supported by the partition member 17a via a bearing B1 in a rotatable manner around the axis Ax. As shown in this figure, the input shaft 13 is connected with an output shaft 2a of the internal-combustion engine 2 via the fly wheel 11 and the damper 12 in an integrally rotatable manner. Since the fly wheel 11 and the damper 12 are the same as well-known ones mounted in an internal-combustion engine for a vehicle, the explanation thereof is omitted. At the inside of the input shaft 13, provided is an oil supplying passage 13a (see FIG. 3) for supplying oil to the compound motor 14 and the like. As shown in FIG. 2, the output shaft 16 is provided coaxially with the input shaft 13. The output shaft 16 is also supported by the case 17 in a rotatable manner around the axis Ax. The output shaft 16 is connected with the input shaft 3a of the transmission 3 in an integrally rotatable manner.

The compound motor 14 comprises a stator 18 having a cylindrical shape, a magnet rotor 19 as a first rotor, and a winding rotor 20 as a second rotor. As shown in this figure, the magnet rotor 19 is provided at the inner side of the stator 18 so as to leave a predetermined gap between the magnet rotor 19 and the stator 18. The magnet rotor 19 has a cylindrical shape and has a space in the inner circumference thereof. The winding rotor 20 is provided in the space existing in the inner circumference of the magnet rotor 19 so as to leave a predetermined gap between the winding rotor 20 and the magnet rotor 19. The winding rotor 20 also has a cylindrical shape, and has a space in the inner circumference thereof. A cylindrical member 17b having a cylindrical shape is inserted into the space existing in the inner circumference of the winding rotor 20, the cylindrical member 17b extending in the axial direction from the partition member 17a. The cross-section shape of the cylindrical member 17b seen in the direction of the axis Ax is not only an exact circle but also may be an ellipse, a polygonal shape, or the like. The input shaft 13 is arranged at the inner side of the cylindrical member 17b. As shown in this figure, a separating wall 17c is provided at an end portion of the transmission 3 side of the cylindrical member 17b. The input shaft 13 extends toward the space of the transmission 3 side in the case 17 through the separating wall 17c. An oil seal 21 is provided between the separating wall 17c and the input shaft 13, as a seal member sealing a gap between them. Thereby, the inside of the cylindrical member 17b is separated from the space of the transmission 3 side in the case 17, and it is suppressed that oil goes into the cylindrical member 17b. The stator 18, the magnet rotor 19, and the winding rotor 20 are arranged coaxially. That is, when being seen in the direction of the axis Ax, the stator 18, the magnet rotor 19, and the winding rotor 20 in this order from the outer side are arranged in a coaxial manner.

The stator 18 is fixed to the case 17 in an unrotatable manner. The stator 18 comprises a stator core 18a and a first to a third stator winding groups. Each stator winding group has a plurality of stator winding units (coils) 18b. These stator winding units 18b are provided to the stator core 18a so as to be arranged in a circumferential direction at regular intervals. In addition, the stator winding units 18b are arranged so that a predetermined number of stator winding units for each of the first stator winding group, the second stator winding group, and the third stator winding group are arranged in this order in the circumferential direction. Then, a three-phase alternating current is applied to the stator winding units 18b. Thereby, the stator winding units 18b generates a rotating magnetic field rotating in the circumferential direction.

The magnet rotor 19 is supported by magnet-rotor supporting bearings B3 and B4 in a rotatable manner around the axis Ax. Therefore, the magnet rotor 19 is provided in a rotatable manner relative to the stator 18. The magnet rotor supporting bearings B3 and B4 are supported by the case 17. The magnet rotor 19 is connected with the output shaft 16 so as to rotate integrally by a connection member 22. The connection member 22 is provided with a magnet rotor resolver 23 for detecting rotational speed of the magnet rotor 19. This resolver 23 is a well-known one which outputs signals corresponding to the rotational speed of the magnet rotor 19. Therefore, detailed explanation thereof is omitted. The magnet rotor 19 comprises a rotor core 19a and a plurality of permanent magnets 19b (see FIG. 1). The plurality of permanent magnets 19b are provided so as to be arranged in the circumferential direction at regular intervals. The magnet rotor 19 supports one end of the input shaft 13 via a bearing B5 in a rotatable manner.

The winding rotor 20 is supported via a winding rotor supporting bearing B6 by the magnet rotor 19 in a rotatable manner around the axis Ax. The winding rotor 20 is connected with the input shaft 13 in an integrally rotatable manner by a connection member 24. Because of this, the winding rotor 20 is also supported by the magnet rotor 19 in a rotatable manner via the bearing B5. By being supported like this, the winding rotor 20 is provided in a rotatable manner relative to each of the stator 18 and the magnet rotor 19. The winding rotor 20 comprises a rotor core 20a and a first to a third rotor winding groups. Each of the rotor winding groups has a plurality of rotor winding units (coils) 20b. These rotor winding units 20b are provided to the rotor core 20a so as to be arranged in a circumferential direction at regular intervals. In addition, the rotor winding units 20b are arranged so that a predetermined number of rotor winding units for each of the first rotor winding group, the second rotor winding group, and the third rotor winding group are arranged in this order in the circumferential direction. Then, a three-phase alternating current is applied to the rotor winding units 20b. Thereby, the rotor winding units 20b generates a rotating magnetic field rotating in the circumferential direction.

The clutch 15 is provided between the magnet rotor 19 and the winding rotor 20. The clutch 15 is configured so as to switch its state between an engagement state that the magnet rotor 19 and the winding rotor 20 are engaged with each other in a integrally rotatable manner and a release state that the engagement of the magnet rotor 19 and the winding rotor 20 is released so that each of the magnet rotor 19 and the winding rotor 20 rotates independently. Since a well-known hydraulic clutch may be applied to the clutch 15, the detailed explanation thereof is omitted.

As shown in FIG. 1, the stator 18 is electrically connected with a battery 7 via an inverter 6. And, the winding rotor 20 is electrically connected with the inverter 6 via a rectifier 8 and a boost converter 9. As mentioned above, the winding rotor 20 is provided in a rotatable manner. With that, as shown in FIG. 2, the compound motor 14 is provided with three of slip ring mechanisms 25 as an electric power transmission unit in order to connect electrically the winding rotor 20 and the rectifier 8.

Figure 3:
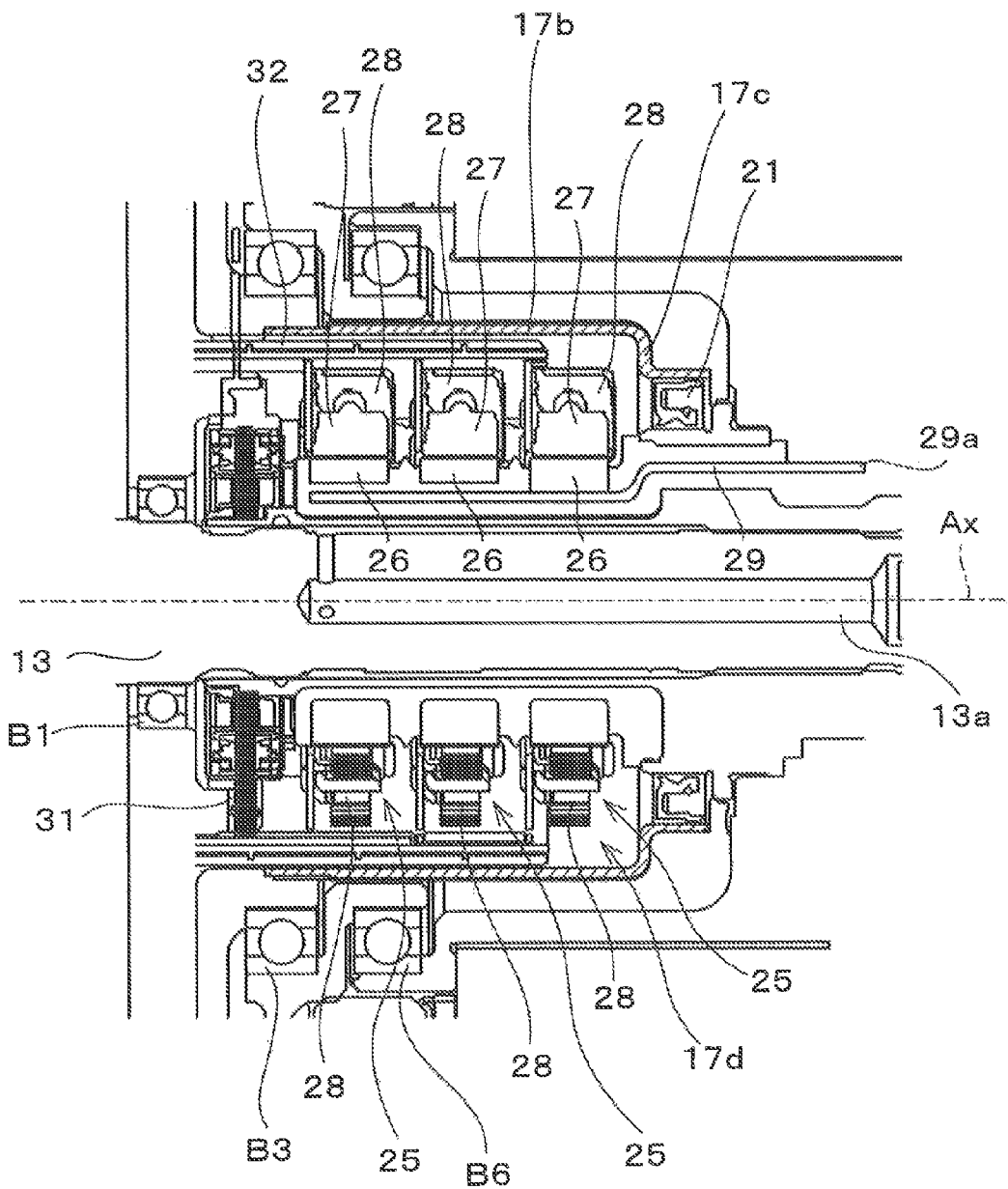
FIG. 3 is a diagram showing an enlarged surround of slip ring mechanisms.

FIG. 3 shows an enlarged view of a surround of the slip ring mechanisms 25. As shown in this figure, each slip ring mechanism 25 comprises: a slip ring 26 as a rotating member; a plurality of brushes 27; and springs 28 for pressing the brushes 27 onto an outer circumferential surface of the slip ring 26. Each slip ring 26 is fixed to the input shaft 13 in an integrally rotatable manner. As shown in this figure, the slip ring 26 is electrically connected with the bus bar 29 provided in the input shaft 13. Although only one bus bar 29 is shown in this figure, the number of bus bars 29 provided is the same number of the slip rings 26 provided. These plural bus bars 29 are arranged in the input shaft 13 so as not to contact with each other. One end 29a of the bus bar 29 is exposed to an outer side of the input shaft 13. The one end 29a is electrically connected with any one of the three rotor winding groups provided in the winding rotor 20. The other two bus bars 29 are also electrically connected with the rotor winding groups respectively, which is not illustrated. Thereby, any one of the three slip rings 26 is electrically connected with each rotor winding unit of the first rotor winding group, the other one of the three slip rings 26 is electrically connected with each rotor winding unit of the second rotor winding group, and the remaining one of the three slip rings 26 is electrically connected with each rotor winding unit of the third rotor winding group.

The plurality of brushes 27 are arranged at an outer side in the radial direction of the slip ring 26. As shown in FIG. 2, each brush 27 is electrically connected with a cable 30. In this figure, shown is only the cable 30 of the slip ring mechanism 25 which is provided on the most transmission 3 side (the right side in FIG. 2), but cables 30 are also connected with the brushes 27 of the other slip ring mechanisms 25 respectively in the same way. The other end of each of the cables 30 is connected with the rectifier 8. Because of this, the rectifier 8 corresponds to a connection object of the present invention.

The input shaft 13 is provided with a winding rotor resolver 31 for detecting the rotational speed of the winding rotor 20. Therefore, this winding rotor resolver 31 corresponds to a rotational speed detecting unit of the present invention. The winding rotor resolver 31 is a well-known one which outputs signals corresponding to the rotational speed of the input shaft 13. Due to this, the detailed explanation thereof is omitted. As shown in this figure, the winding rotor resolver 31 is arranged so as to be aligned with the slip ring mechanisms 25 with respect to the axial direction. The size of the winding rotor resolver 31 with respect to the radial direction thereof (the vertical direction in FIG. 2) is set so as to be equal to the size of the slip ring mechanisms 25 with respect to the radial direction thereof.

The size of each slip ring mechanism 25 with respect to the radial direction is set so as to be smaller than an internal diameter of the winding rotor 20. As shown in FIGS. 2 and 3, all of the three slip ring mechanisms 25 are arranged in the space of the inner circumference of the winding rotor 20. More specifically, all of the slip ring mechanisms 25 are arranged in a housing room 17d which is formed at the inner side of the winding rotor 20. As shown in FIG. 2, the housing room 17d is formed so as to be sectioned by the partition member 17a, the cylindrical member 17b, and the separating wall 17c. Due to this, in the housing room 17d, the space existing on the internal-combustion engine 2 side and the space existing on the transmitter 3 side are sectionalized from each other. In a similar way, a part of the winding rotor resolver 31 is also arranged in the space of the inner circumference of the winding rotor 20. Between each slip ring mechanism 25 and the inner circumference surface of the cylindrical member 17b, an insulating cover 32 having a cylindrical shape as an insulating member is inserted in order to prevent a short circuit. The cables 30 are arranged in a gap between the insulating cover 32 and the slip ring mechanisms 25. The cable 30 is arranged so as to extend in the axial direction within the cylindrical member 17b, and after passing through the partition member 17a with passing through the outer side with respect to the radial direction of the winding rotor resolver 31, to extend in the radial direction.

As shown in FIG. 2, as the bearing B3 which is provided on the internal-combustion engine 2 side within the magnet-rotor supporting bearings, used is a bearing which has an internal diameter thereof larger than the size of the slip ring mechanisms 25 with respect to the radial direction. Also, as the winding rotor supporting bearing B6, used is a bearing which has an internal diameter thereof larger than the size of the slip ring mechanisms 25 with respect to the radial direction. These bearings B3 and B6 are arranged at the outer side of the slip ring mechanisms 25 with respect to the radial direction. That is, the bearings B3 and B6 and the slip ring mechanisms 25 are arranged so as to be aligned with respect to the radial direction. Therefore, each of the bearings B3 and B6 corresponds to a large diameter bearing of the present invention.

Next, in reference to FIGS. 4 and 5, operations of the compound motor 14 and the power transmission device 10 will be explained. In these figures, the slip ring mechanism 25 is shown at the outside of the winding rotor 20 for convenience sake. The operation of the power transmission device 10 is not different between a case that the slip ring mechanism 25 is provided inside the winding rotor 20 and a case that the slip ring mechanism 25 is provided outride the winding rotor 20. In addition, in these figures, it is omitted to illustrate a part of devices in the power transmission device 10. In these figures, a black thick line indicates a flow of mechanical power, and a gray thick line indicates a flow of electrical power. As mentioned above, in the compound motor 14, the winding units (the coils) are provided to both of the stator 18 and the winding rotor 20, and the compound motor 14 can generate a rotating magnetic field at both of them. Then, the compound motor 14 can rotate the magnet rotor 19 by the rotating magnetic fields generated. That is, in the compound motor 14, the first motor generator is constructed by the stator 18 and the magnet rotor 19, the second motor generator is constructed by the winding rotor 20 and the magnet rotor 19. The power transmission device 10 transmits power using those two motor generators as appropriate.

Figure 4:
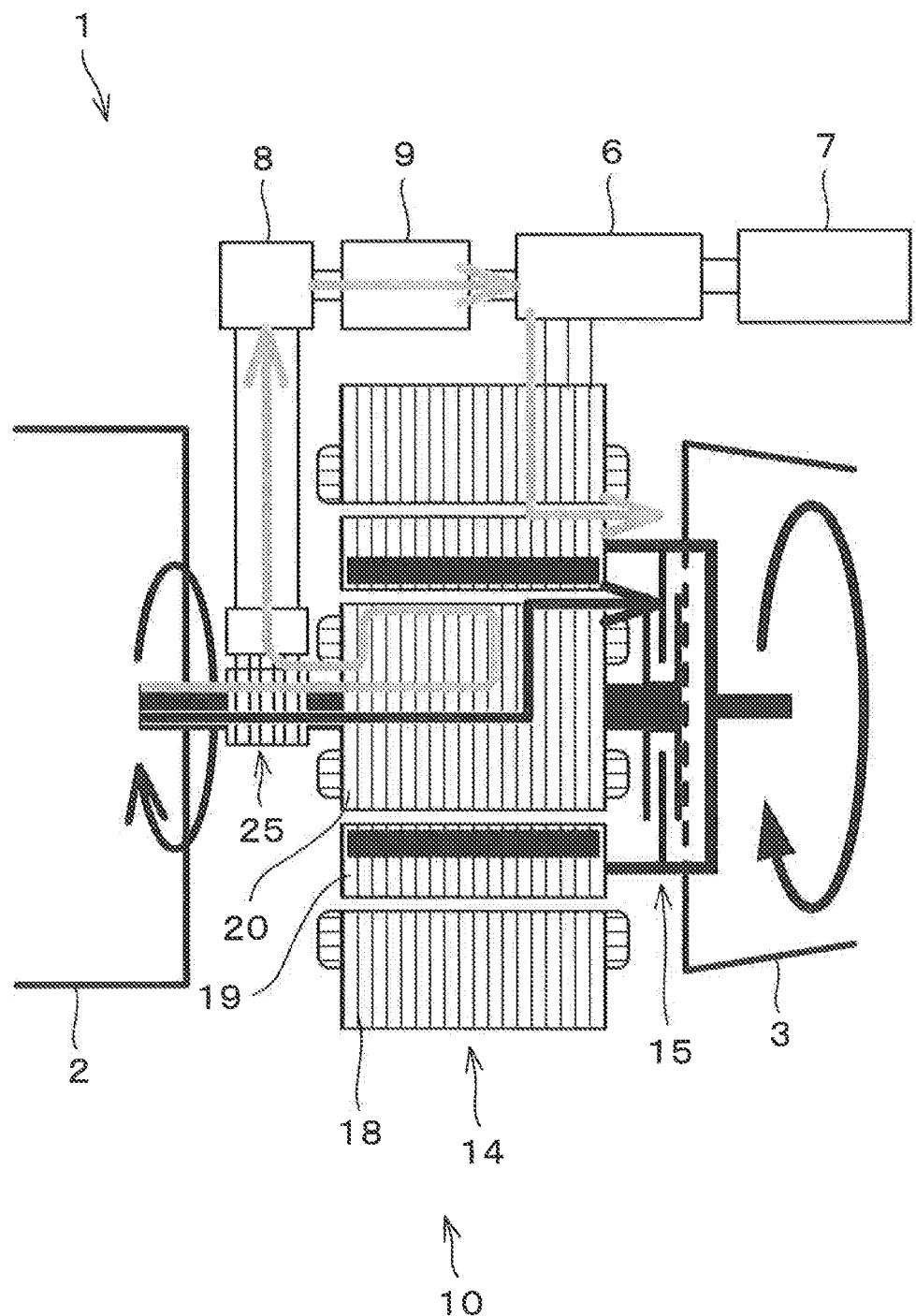
FIG. 4 is a diagram for explaining power flow at the moment when the vehicle starts moving.
Figure 5:
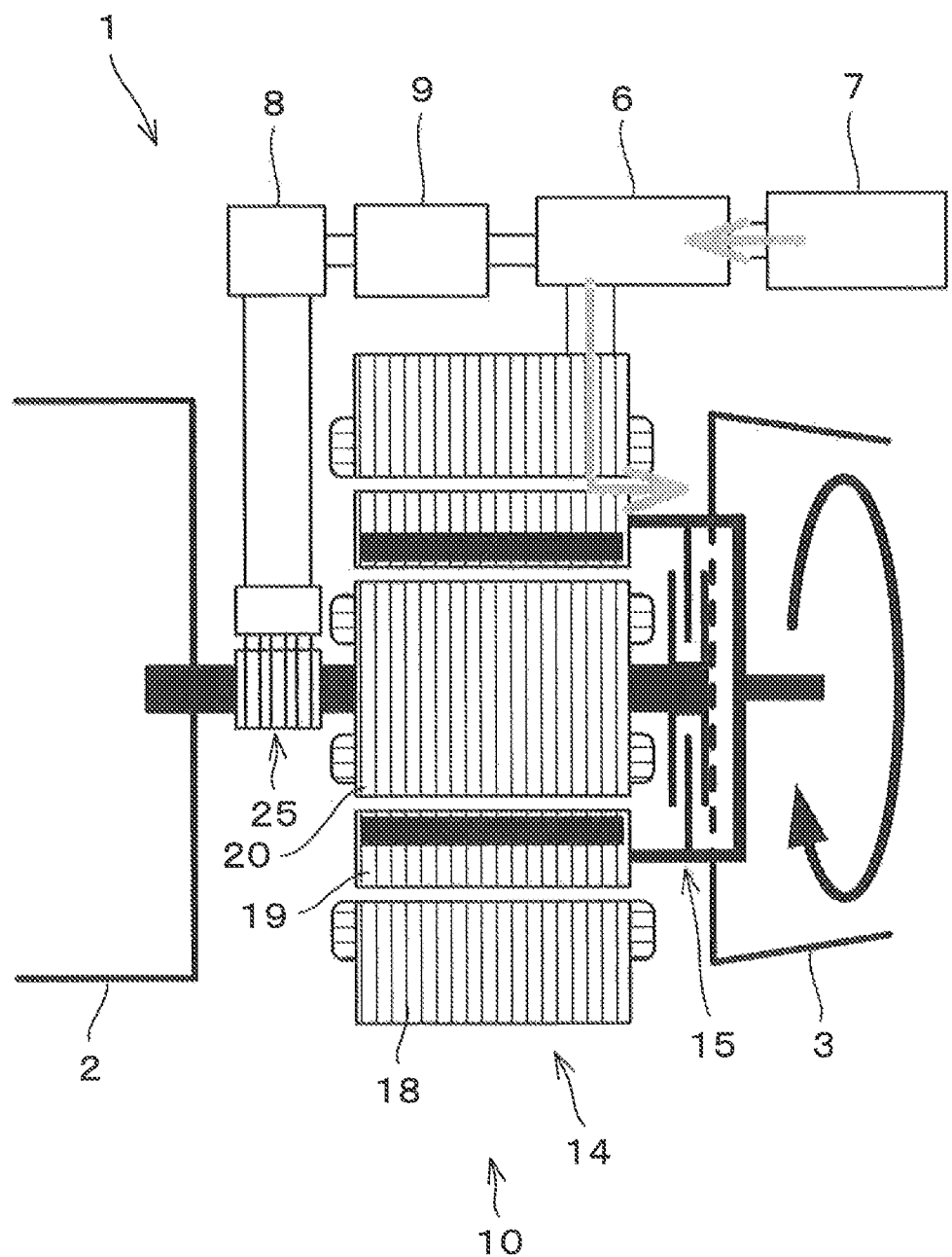
FIG. 5 is a diagram for explaining power flow at the moment while the vehicle is being driven by a compound motor.

FIG. 4 shows a flow of power at the moment when the vehicle 1 starts moving. In the state shown in FIG. 4, the internal-combustion engine 2 is operating, and the state of clutch 15 is switched to the release state. If the rotational speed of the internal-combustion engine 2 is increased from such state, the rotational speed of the winding rotor 20 increases. Thereby, at the rotor winding units 20b of the winding rotor 20 electricity is generated, and magnetic force is generated. Due to this, in association with the rotation of the winding rotor 20, the magnet rotor 19 also starts to rotate. Thereby, the rotation is transmitted to the transmission 3. The electricity generated at the rotor winding units 20b is transmitted to the rectifier 8 via the slip ring mechanisms 25. After that, the electricity is transmitted from the rectifier 8 to the stator 18 via the boost converter 9 and the inverter 6. Due to this, the rotating magnetic field is generated at the stator 18, and the magnet rotor 19 is driven to rotate. As mentioned above, in the power transmission device 10, the magnet rotor 19 is driven at the moment when the vehicle 1 starts moving, by using both of electrical force and magnetic force generated at the winding rotor 20. Thereby, it is possible to amplify the driving torque of the magnet rotor 19. That is, the power transmission device 10 functions like the torque converter. In a case that the rotational speed of the winding rotor 20 and the rotational speed of the magnet rotor 19 are almost equal to each other, the state of clutch 15 is switched to the engagement state, and the internal-combustion engine 2 and the transmission 3 are connected with each other. In this way, the clutch 15 functions as a so-called lock-up clutch. In a case that the vehicle 1 is driven by the internal-combustion engine 2, this state is kept.

Next, in reference to FIG. 5, a case that the vehicle 1 is driven by the compound motor 14 will be explained. In this case, the internal-combustion engine 2 is stopped, and the state of clutch 15 is switched to the release state. In this state, the electricity is supplied from the battery 7 to the stator 18 via the inverter 6. Thereby, the rotating magnetic field is generated at the stator 18, and the magnet rotor 19 is driven to rotate. Thereby, the input shaft 3a of the transmission 3 is driven to rotate. That is, in this case, the vehicle 1 is driven by using the first motor generator of the compound motor 14, which is mentioned above.

As mentioned above, according to the compound motor 14 of the first embodiment, since all of the slip ring mechanisms 25 are arranged in the space of the inner circumference of the winding rotor 20, it is possible to reduce the length of the compound motor 14 with respect to the axial direction. In addition, since the bearings B3 and B6 are arranged at the outer side of the slip ring mechanisms 25 with respect to the radial direction, it is possible to also reduce the length with respect to the axial direction by the length of the bearings. Further, since a part of the winding rotor resolver 31 is also arranged at the inner side of the winding rotor 20, it is possible to reduce the length with respect to the axial direction by the length of the part of winding rotor resolver 31 arranged at the inner side of the winding rotor 20. In this way, it is possible to reduce the length with respect to the axial direction of the compound motor 14. Thereby, it is possible to reduce the length with respect to the axial direction of the power transmission device 10. Because of this, it is possible to improve the mountability to the vehicle 1.

Further, according to the compound motor 14, after assembling the magnet rotor 19 and the winding rotor 20, it is possible to insert the slip ring mechanisms 25 into the inner side of the winding rotor 20 from the side where the bearings B3 and B6 are arranged (the internal-combustion engine 2 side of FIG. 2). Due to this, it is possible to reduce time-consuming things with respect to assembly operation of the power transmission device 10.

In the compound motor 14 of the first embodiment, since the outer diameter of the winding rotor 20 is longer in comparing with a case that the slip ring mechanisms 25 are arranged at the outer side of the compound motor 14, the rotating torque of the winding rotor 20 increases. Due to this, even if the length with respect to the axial direction is reduced, it is possible to suppress the decrease of the torque generated by the winding rotor 20.

In the compound motor 14 of the first embodiment, since the insulating cover 32 is provided between the slip ring mechanisms 25 and the winding rotor 20, it is possible to arrange the slip ring mechanisms 25 near the winding rotor 20. Due to this, it is possible to suppress increase of length of the compound motor 14 with respect to the radial direction.

In addition, in this embodiment, the whole of winding rotor resolver 31 may be arranged at the inner side of the winding rotor 20. In this case, it is possible to further reduce the length of the compound motor 14 with respect to the axial direction.

The Second Embodiment

Figure 6:
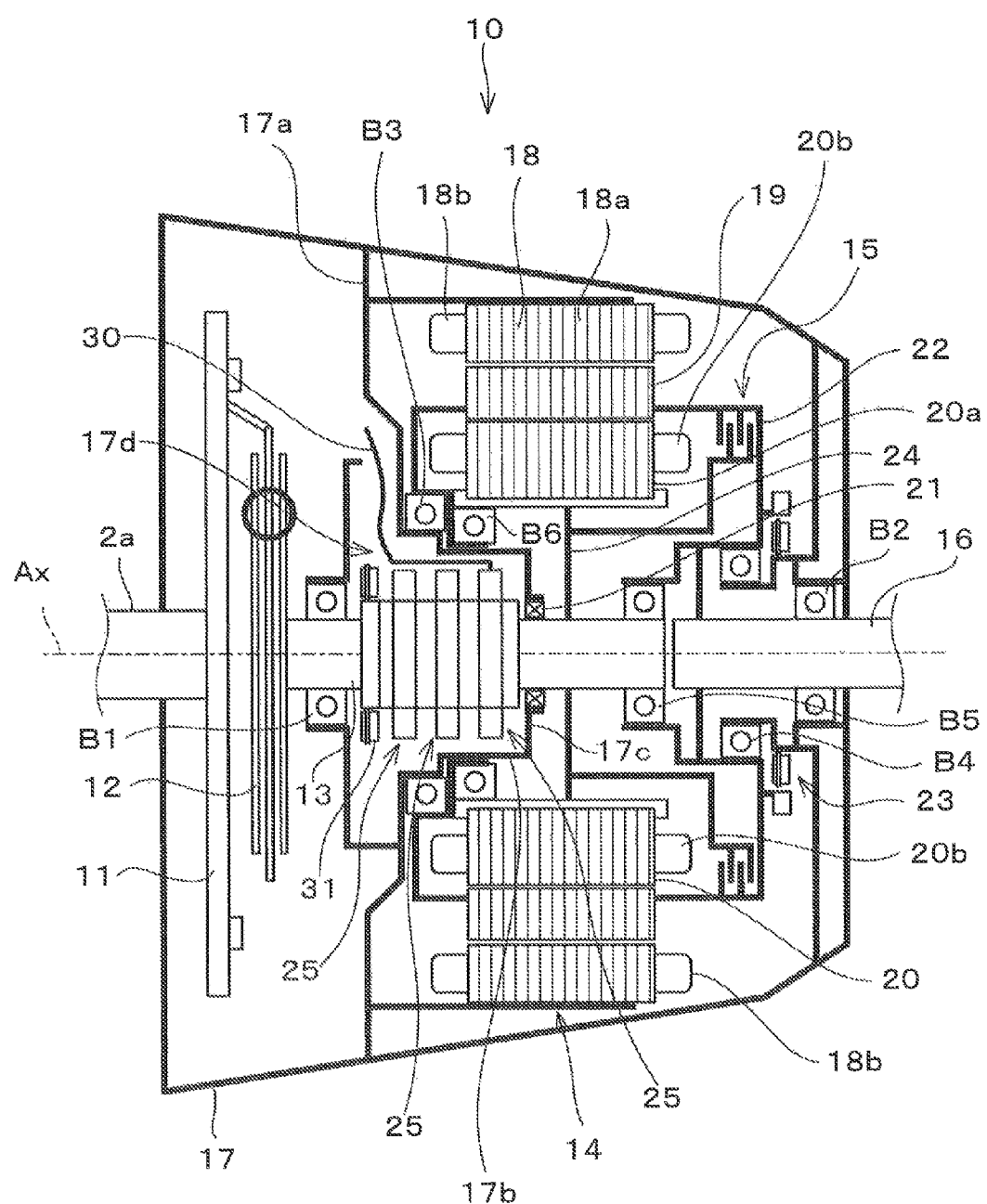
FIG. 6 is a diagram showing schematically a power transmission device where a rotating electric machine according to a second embodiment of the present invention.

In reference to FIG. 6, the rotating electric machine of the second embodiment will be described. FIG. 6 is a schematic view corresponding to FIG. 2 of the first embodiment. In this embodiment, on portions which are identical to those in the first embodiment, the same reference numbers are put, and the explanations thereof are omitted.

As apparent from this figure, in the second embodiment, two of the three slip ring mechanisms 25 are arranged at the inner side of the winding rotor 20 with respect to the radial direction. The remaining one slip ring mechanism 25 is arranged at the outside of the winding rotor 20. The winding rotor resolver 31 is also arranged at the outside of the winding rotor 20. The cable 30 is arranged to extend in the axial direction until the slip ring mechanism 25 provided next to the winding rotor resolver 31, and after that, extend to the outer side with respect to the radial direction before reaching the winding rotor resolver 31. Except this, the second embodiment is the same as the first embodiment.

In the compound motor 14 of the second embodiment, since a part of the three slip ring mechanisms 25 are arranged at the inner side of the winding rotor 20 with respect to the radial direction, it is possible to reduce the length of the compound motor 14 with respect to the axial direction by the length of the part. Further, also in this embodiment as with the first embodiment, the bearings B3 and B6 are arranged at the outer side of the slip ring mechanisms 25 with respect to the radial direction. Due to this, it is possible to reduce the length with respect to the axial direction by the length of the bearings. Accordingly, also in this embodiment, it is possible to reduce the length of the compound motor 14 with respect to the axial direction. Further, because of this, the length of the power transmission device 10 can be also reduced. Due to this, it is possible to improve the motability to the vehicle 1.

In this embodiment, since only two of the three slip ring mechanisms 25 are arranged at the inside of the winding rotor 20, it is possible to reduce the length of the cable 30 which is arranged between the slip ring mechanism 25 and the cylindrical member 17b. Since the cable 30 does not go through the outer side of the winding rotor resolver 31 with respect to the radial direction, it is possible to arrange the cable 30, regardless of the size of the resolver 31 with respect to the radial direction.

Figure 7:
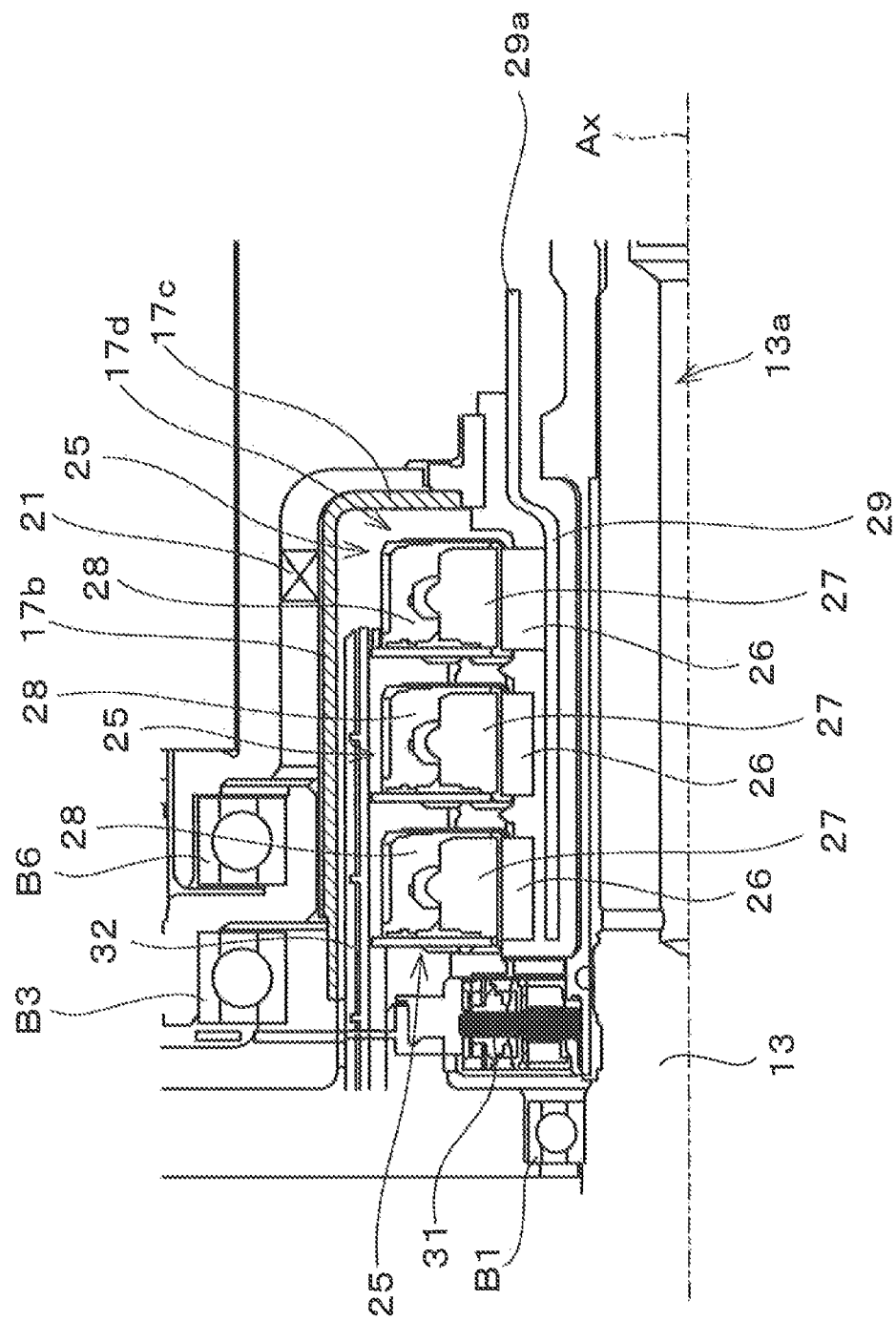
FIG. 7 is a diagram showing an enlarged surround of slip ring mechanisms of the rotating electric machine according to a variation of the present invention.

The present invention is not limited to each embodiment above mentioned, and is possible to be realized in various kinds of embodiments. For example, though in each embodiment above mentioned, the oil seal 21 is arranged so as to be aligned with the slip ring mechanisms 25 with respect to the axial direction, the position where the oil seal 21 is provided is not limited to such position. For example, as shown in FIG. 7, the oil seal 21 may be provided at the outer side of the slip ring mechanisms 25 with respect to the radial direction. To portions which are identical to the portions in each of the embodiments, the same reference numbers are given, and the explanations thereof are omitted. By providing the oil seal 21 at such position, it is possible to further reduce the length of the compound motor 14 with respect to the axial direction.

In the embodiments above mentioned, each rotor is supported by two bearings in a rotatable manner, but the number of bearings is not limited to two. Each rotor may be supported by three or more bearings in a rotatable manner. In this case, it is also possible to reduce the length of the rotating electric machine with respect to the axial direction, by using a bearing having its inner diameter longer than the size of the slip ring mechanism with respect to the radial direction, and arranging such bearing at the outer side of the slip ring mechanism with respect to the radial direction.

In the embodiments above mentioned, described was the case that the rotating electric machine of the present invention is installed in the power transmission device. However, without installing the rotating electric machine in the power transmission device, the rotating electric machine may be used singly.

The invention claimed is:

1. A rotating electric machine comprising:
a first rotor being supported by a plurality of bearings in a rotatable manner around an axis, the first rotor having an inner circumference in which a space is formed;
a second rotor being supported by a plurality of bearings in a rotatable manner relative to the first rotor while being arranged coaxially with the first rotor in the space of the inner circumference of the first rotor, the second rotor having coils;
an electric power transmission unit having at least one rotating member which rotates integrally with the second rotor by being connected electrically with the coils, the electric power transmission unit connecting a predetermined connection object fixed in an unrotatable manner and the coils, wherein
the electric power transmission unit includes a slip ring as the rotating member and a plurality of brushes for each slip ring;
a space is formed in an inner circumference of the second rotor,
at least a part of the power transmission unit is arranged in the space of the inner circumference of the second rotor,
both of the plurality of bearings supporting the first rotor and the plurality of bearings supporting the second rotor include a large diameter bearing having an internal diameter which is larger than an outer diameter of the electric power transmission unit with respect to a radial direction, and
the large diameter bearing supporting the second rotor permits the second rotor to rotate relative to the first rotor and is arranged outside the electric power transmission unit with respect to the radial direction.

2. The rotating electric machine according to claim 1, wherein a whole of the electric power transmission unit is arranged in the space in the inner circumference of the second rotor.

3. The rotating electric machine according to claim 2, further comprising a rotational speed detecting unit which is configured to detect rotational speed of the second rotor, wherein size of the rotational speed detecting unit with respect to a radial direction is set so as to be equal to size of the electric power transmission unit with respect to a radial direction, and
at least a part of the rotational speed detecting device is arranged in the space in the inner circumference of the second rotor.

4. The rotating electric machine according to claim 1, wherein
a part of the electric power transmission unit is arranged in the space of the inner circumference of the second rotor, and a remaining part of the electric power transmission unit is arranged outside the space of the inner circumference of the second rotor.

5. The rotating electric machine according to claim 4, wherein
a rotational speed detecting unit configured to detect the rotational speed of the second rotor is provided so as to be aligned with the electric power transmission unit with respect to an axial direction, outside the space of the inner circumference of the second rotor, and
the electric power transmission unit has a cable member: extending in the axial direction from a part where the cable member is arranged in the space of the inner circumference of the second rotor until an outside of the second rotor; and having a direction extending outside with respect to the radial direction which is changed before reaching the rotational speed detecting unit.

6. The rotating electric machine according to claim 1, further comprising
a seal member for separating between the space where the second rotor is arranged and the space where the electric power transmission unit is arranged, wherein
the seal member is: formed so that an external diameter of the seal member is smaller than an internal diameter of the second rotor and an internal diameter of the seal member is larger than the size of the electric power transmission unit with respect to the radial direction; and arranged outside the electric power transmission unit with respect to the radial direction.

7. The rotating electric machine according to claim 1, wherein
an insulating member is provided between the second rotor and the electric power transmission unit.

8. A power transmission device comprising the rotating electric machine according to claim 1, wherein
one of the first rotor and the second rotor is connected with a power source, and
the other one of the first rotor and the second rotor is connected with a drive object which is driven by the power source.

* * * * *